US008341293B2

(12) United States Patent
Ahn et al.

(10) Patent No.: US 8,341,293 B2
(45) Date of Patent: Dec. 25, 2012

(54) PEER-TO-PEER (P2P) NETWORK SYSTEM AND METHOD OF OPERATING THE SAME BASED ON REGION

(75) Inventors: Jae-min Ahn, Seoul (KR); Ji-yon Han, Seoul (KR); Jeonghwa Song, Suwon-si (KR); Uram H. Yoon, Seoul (KR); Keon-il Jeong, Seongnam-si (KR); Eo-hyung Lee, Seoul (KR); Kyung-lang Park, Seoul (KR); Shin-dug Kim, Goyang-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 232 days.

(21) Appl. No.: 12/431,051

(22) Filed: Apr. 28, 2009

(65) Prior Publication Data
US 2009/0276540 A1   Nov. 5, 2009

(30) Foreign Application Priority Data
Apr. 30, 2008   (KR) ................. 10-2008-0040798

(51) Int. Cl.
*G06F 15/16* (2006.01)
(52) U.S. Cl. ........ 709/243; 709/244; 709/247; 709/248; 709/251; 709/252
(58) Field of Classification Search .................. 709/243, 709/244, 247, 248, 251, 252
See application file for complete search history.

(56) References Cited

U.S. PATENT DOCUMENTS

| | | | | |
|---|---|---|---|---|
| 6,973,023 B1 * | 12/2005 | Saleh et al. | ................. | 370/217 |
| 7,065,588 B2 * | 6/2006 | Konda et al. | .................. | 709/246 |
| 7,171,415 B2 * | 1/2007 | Kan et al. | ............... | 1/1 |
| 7,280,557 B1 * | 10/2007 | Biswas et al. | ................. | 370/465 |
| 7,321,928 B2 * | 1/2008 | Feltin et al. | .................. | 709/223 |
| 7,443,803 B2 * | 10/2008 | Su et al. | ....................... | 370/252 |
| 7,536,458 B2 * | 5/2009 | Teodosiu et al. | ............. | 709/225 |
| 7,571,251 B2 * | 8/2009 | Bowman | ....................... | 709/242 |
| 7,584,226 B2 * | 9/2009 | Fatula et al. | .......................... | 1/1 |
| 7,617,178 B2 * | 11/2009 | Chavez et al. | ....................... | 1/1 |
| 7,656,836 B2 * | 2/2010 | Baker et al. | .................... | 370/328 |
| 7,673,143 B1 * | 3/2010 | Yeager et al. | ................. | 713/175 |
| 7,852,788 B2 * | 12/2010 | Mohamed-Rasheed et al. | ............................. | 370/254 |
| 7,865,575 B2 * | 1/2011 | Leitheiser | .................... | 709/219 |
| 7,873,697 B2 * | 1/2011 | Goldstein et al. | ............ | 709/207 |
| 7,876,698 B2 * | 1/2011 | Sienel et al. | ................... | 370/252 |
| 8,103,777 B2 * | 1/2012 | Verhaegh et al. | ............. | 709/226 |
| 8,108,548 B2 * | 1/2012 | Teodosiu et al. | ............. | 709/238 |

(Continued)

FOREIGN PATENT DOCUMENTS
JP   2004-258747   9/2004
(Continued)

*Primary Examiner* — Backhean Tiv
(74) *Attorney, Agent, or Firm* — NSIP Law

(57) ABSTRACT

A peer-to-peer (P2P) network system and a method of operating the P2P network system based on region are provided. If an edge peer storing a resource information list of a super peer migrates to a different super peer and is registered and connected with the different super peer, the edge peer transfers the resource information list to the different super peer to share the resource information list. Resources may be searched based on a region information list into which resource information lists of adjacent super peers are integrated.

14 Claims, 11 Drawing Sheets

U.S. PATENT DOCUMENTS

| | | | |
|---|---|---|---|
| 2002/0120783 A1* | 8/2002 | Evgey | 709/247 |
| 2004/0054807 A1 | 3/2004 | Harvey et al. | |
| 2007/0073861 A1* | 3/2007 | Amanuddin et al. | 709/224 |
| 2007/0237133 A1* | 10/2007 | Woods et al. | 370/352 |
| 2008/0005195 A1* | 1/2008 | Li | 707/203 |
| 2008/0089299 A1* | 4/2008 | Lindsley et al. | 370/338 |
| 2008/0140780 A1* | 6/2008 | Hopkins et al. | 709/205 |
| 2008/0160911 A1* | 7/2008 | Chou et al. | 455/7 |
| 2008/0175190 A1* | 7/2008 | Lee et al. | 370/328 |
| 2008/0288580 A1* | 11/2008 | Wang et al. | 709/203 |
| 2009/0210545 A1* | 8/2009 | Wright | 709/230 |
| 2010/0049846 A1* | 2/2010 | Ballette et al. | 709/224 |
| 2011/0071841 A1* | 3/2011 | Fomenko et al. | 705/1.1 |

FOREIGN PATENT DOCUMENTS

| | | |
|---|---|---|
| JP | 2005-234878 | 9/2005 |
| JP | 2006-221423 | 8/2006 |
| JP | 2007-193626 | 8/2007 |

* cited by examiner

PEER-TO-PEER (P2P) NETWORK SYSTEM AND METHOD OF OPERATING THE SAME BASED ON REGION

CROSS-REFERENCE TO RELATED APPLICATION(S)

This application claims the benefit under 35 U.S.C. §119(a) of Korean Patent Application No. 10-2008-0040798, filed on Apr. 30, 2008 in the Korean Intellectual Property Office, the disclosure of which is incorporated herein in its entirety by reference.

BACKGROUND

1. Field

The following description relates to a peer-to-peer (P2P) network system and a method of operating the same based on a region, and more particularly, to a P2P network system that supports resource searching by classifying super peers of the P2P network system into fixed regions, and a method of operating the P2P network system based on the fixed regions.

2. Description of the Related Art

Development of wired and wireless Internet technology has led to the emergence of systems for sharing resources through the Internet. Such resource sharing systems adopt peer-to-peer (P2P) technology as networking technology to share resources. A P2P system includes a plurality of peers that are connected to each other through a network, wherein each peer may store at least one resource, such as software and content, and the peers may share these resources through the network.

A P2P system is based on hybrid P2P architecture or pure P2P architecture. In the hybrid P2P architecture, peers of a network are connected to a central sever and share their resources through the central server. Meanwhile, in the pure P2P architecture, peers are connected directly to each other to share their resources. In particular, the hybrid P2P architecture has an advantage of more easily solving problems related to peer power management and network updating by using the central server to manage the peers.

However, in the hybrid P2P architecture, peers only recognize their logical relationship to one another. In particular, super peers, which correspond to central servers, recognize other super peers that are connected to each other and do not consider physical distance separating the super peers. Accordingly, when a specific edge peer that is registered and connected with a super peer searches for resources, the edge peer collects information regarding resources of all edge peers registered with the super peer, regardless of physical distance from the edge peer. As a result, the edge peer searching for resources may search for or download a resource from another edge peer that is located far away, even when it could have found the resource from a different edge peer that is closer. As a result, the increase in the load on the network may prevent other edge peers from searching for resources, and may even result in the network crashing.

SUMMARY

In one general aspect, a peer-to-peer (P2P) network system includes at least one edge peer for storing a resource; and at least one super peer for classifying and distributing resource information regarding the resource stored in the at least one edge peer, and for generating and managing a resource information list, wherein the at least one edge peer is registered and connected to the at least one super peer, and the at least one super peer generates and manages a region information list by sharing the resource information list with an adjacent super peer.

The at least one edge peer may receive and store the resource information list and the region information list from the at least one super peer with which the at least one edge peer is registered and connected.

When the at least one edge peer migrates to a different super peer, to be registered and connected with the different super peer, the at least one edge peer may transfer a previous region information list received from a previous super peer with which the at least one edge peer was registered and connected, to the different super peer, and update the previous region information list to a region information list received from the different super peer.

The at least one super peer may receive the previous region information list from the at least one edge peer, and share the region information list by communicating with the previous super peer based on the previous region information list.

The at least one super peer may transfer to the at least edge peer an updated region information list, the updated region information list generated by sharing the region information list with the previous super peer.

The at least one super peer may transmit the updated region information list to the different super peer.

When the at least one edge peer requests to search for a resource, the at least one super peer may search for the resource in the region information list.

When the at least one super peer fails to find resource information corresponding to the resource requested to be searched for in the region information list by the at least one edge peer, the at least one super peer may request a different super peer, which receives distributed resource information, to search for the resource.

When the at least one super peer fails to find resource information corresponding to the resource requested to be searched for in the region information list by the at least one edge peer, the at least one super peer may request other super peers, which receive distributed resource information, to search for the resource.

In another general aspect, a method of operating a peer-to-peer (P2P) network system based on region, including registering and connecting at least one edge peer, the at least one edge peer storing resources with at least one super peer for generating and managing a resource information list by classifying and distributing resource information regarding resources of a plurality of edge peers; sharing the resource information list of the at least one super peer among the at least one super peer; generating, by the at least one super peer, a region information list based on the shared resource information list; receiving and storing, at the at least one edge peer, the resource information list and the region information list from the at least one super peer with which the at least one edge peer is registered and connected; migrating the at least one edge peer; registering and connecting the at least one edge peer with a different super peer due to the migration of the edge peer; transferring, at the at least one edge peer, a previous region information list received from a previous super peer, the at least one edge peer previously registered and connected with the previous super peer, to the at least one super peer with which the edge peer is registered and connected; and updating, at the at least one edge peer, the previous region information list to the region information list received from the at least one super peer with which the at least one edge peer is registered and connected.

The method may further include receiving, at the super peer, the previous region information list received from the previous super peer with which the at least one edge peer was registered and connected, from the moved at least edge peer; and sharing the region information list by communicating with the previous super peer based on the previous region information list.

The method may further include transferring, at the at least one super peer, an updated region information list generated by sharing the region information list with the previous super peer to the at least one edge peer.

The method may further include transmitting, at the at least one super peer, the updated region information list to the different super peer, the different super peer sharing its region information list with the at least one super peer.

The method may further include requesting, at the at least one edge peer, the at least one super peer with which the at least one edge peer is registered and connected to search for a resource; and searching, at the at least one super peer, for the resource in the region information list.

When the at least one super peer fails to find resource information corresponding to the resource requested to be searched for in the region information list by the at least one edge peer, the method may further include requesting, at the at least one super peer, a different super peer sharing its own region information list with the at least one super peer to search for the resource.

When the at least one super peer fails to find resource information corresponding to the resource requested to be searched for in the region information list by the at least one edge peer, the method may further include requesting, at the super peer, a plurality of super peers to which the resource information has been distributed to search for the resource.

Other features and aspects will be apparent from the following detailed description, the drawings, and the claims.

Figure 1:
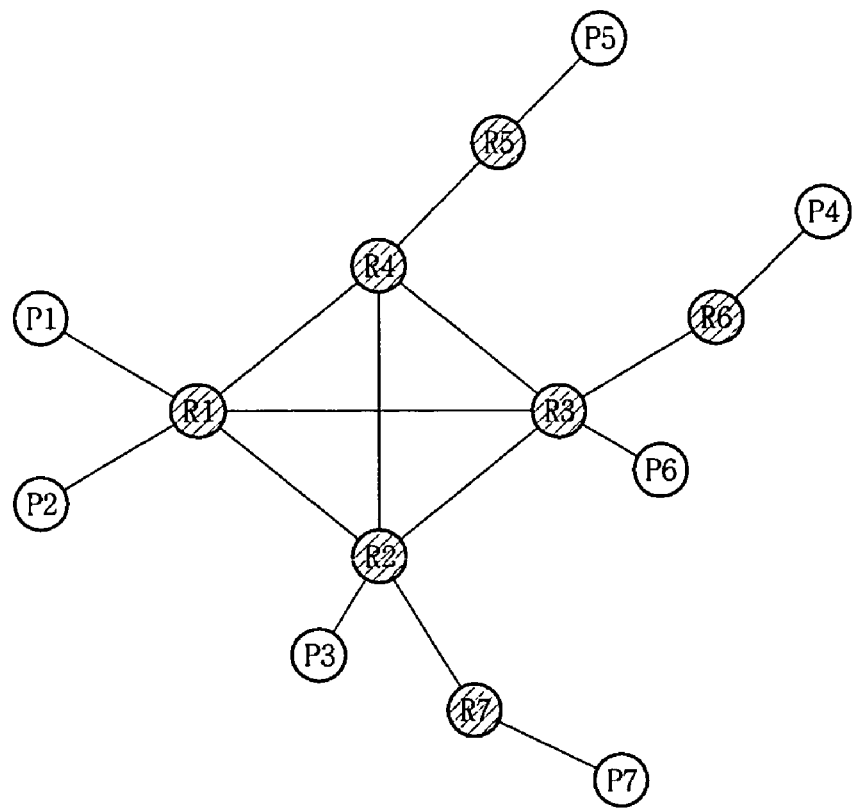
FIG. 1 is a diagram schematically showing an exemplary configuration of a .P2P. network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In the following description, a P2P network is based on hybrid P2P architecture in which the P2P network includes edge peers that exchange resources and super peers that manage the edge peers. That is, in the hybrid P2P architecture, a plurality of edge peers are each connected to a corresponding one of a plurality of interconnected super peers, and the edge peers share resources with each other through at least one super peer.

The term "peer" describes a node in the P2P network, physically corresponding to a terminal of the network system. A peer may be a mobile communication terminal, a personal computer (PC), or the like. The term "edge peer" describes a terminal that may generate and store information independently. Edge peers may share their resources by transmitting resources to or receiving resources from other edge peers. The term "super peer" describes a terminal which manages edge peers. Super peers are connected to each other. In other words, super peers may share resource information stored in each edge peer by sharing information regarding edge peers connected to themselves. Super peers may manage edge peers in the form of a list and may manage resource information of edge peers in the form of a table. In the following description, exemplary edge peers have mobility and exemplary super peers have limited mobility. However, some of edge peers may have limited mobility and some of super peers may have mobility. Also, super peers, in addition to managing edge peers, may also generate and store resources or request edge peers to transmit resources. However, for simplicity, it is assumed in the following description that super peers only manage edge peers.

In the following description, the term "resource" describes hardware, software, content, and the like. For example, a resource may be an MP3 file, a picture file, a motion picture file, or similar file. Such a resource may be generated and regenerated using various functions included in the peers. For example, if a peer includes a camera module capable of capturing images of objects, then images collected using the camera module may be resources of the peer.

Also, the term "resource information," which is described herein, describes characteristic information regarding corresponding resources. The resource information includes a resource name, an identification address of a location at which the resource is stored, and the like. The resource information is classified by each super peer according to a predetermined rule, and the classified resource information is distributed to the super peers according to a predetermined rule. Here, the predetermined rule is defined by a designer of the system and, for example, is used to classify information included in the resource information according to predetermined criteria. The resource information classified in this way may again be distributed according to a predetermined rule and stored in each super peer in the form of a predetermined list. For example, the resource information may be classified in units of predetermined index values by performing index value organizing using a hash function, and the classified index values may be grouped into predetermined ranges and assigned as resource information lists to the respective super peers.

A region information list, which is described herein, may be obtained by collecting and integrating resource information lists from super peers physically adjacent to a specific super peer, that is, from super peers located within a predetermined range (e.g., within a hop count of 1) from a specific super peer. Values of the region information list change when the edge peers move in the P2P network system. For example, when the P2P network is initially established, that is, before any edge peer moves, since no super peer may acquire information regarding other super peers physically adjacent to itself, each super peer generates its own resource information list into region information, and then transmits the region information list to edge peers registered and connected with itself. Thereafter, if a certain edge peer moves, a super peer with which the edge peer moves and registers collects from the newly registered and connected edge peer a region information list of a previous super peer with which the edge peer was previously registered and connected. In this manner, each super peer acquires information regarding other super peers adjacent to itself and accordingly may communicate with the adjacent super peers. Then, the super peer updates the region information list to include resource information lists of the adjacent super peers, and transmits the updated region information list to its edge peers and the adjacent super peers.

Also, in the following description, edge peers may be classified into request edge peers and destination edge peers depending on whether they request or provide resources. That is, a destination edge peer stores a resource which a request edge peer searches for, and the request edge peer transmits a query to the destination edge peer through a super peer connected to the request edge peer in order to receive the resource stored in the destination edge peer. Here, a super peer managing the destination edge peer is called a destination super peer, and a super peer managing the request edge peer is called a request super peer.

FIG. 1 is a diagram schematically showing an exemplary configuration of a P2P network system.

Referring to FIG. 1, the P2P network system includes a plurality of peers which are classified into a plurality of edge peers P1 through P7 and a plurality of super peers R1 through R7, according to their roles.

The first through seventh edge peers P1 through P7 are individually registered and connected with at least one among the first through seventh super peers R1 through R7. The first through seventh edge peers P1 through P7 register their resource information in the super peers in which they are registered. Accordingly, a super peer with which edge peers are connected as child edge peers may recognize what resources are stored in their child edge peers. Also, each of the first through seventh edge peers P1 through P7 may generate and store resources.

In particular, when the first through seventh edge peers P1 through P7 are newly registered or connected with a super peer after an initial state in which they are registered and connected with no super peer, when the first through seventh edge peers P1 through P7 connected to a specific super peer are disconnected from the super peer and connected to a different super peer, or when at least one of the first through seventh edge peers P1 through P7 is elected as a new super peer due to elimination of a super peer, the first through seventh edge peers P1 through P7 receive from the newly connected super peer and store a region information list representing the attributes of a region to which they are connected. That is, when the first through seventh edge peers P1 through P7 are newly registered or connected with a specific super peer, the first through seventh edge peers P1 through P7 register resource information regarding their resources with the specific super peer, while receiving and storing a region information list provided by the specific super peer.

Meanwhile, the first through seventh edge peers P1 through P7 may store data representing the correlation between the first through seventh edge peers P1 through P7 and the specific super peer in the form of a data structure such as Table 1.

TABLE 1

| Name of Super Peer | IP | Port | Time |
| --- | --- | --- | --- |
| Connected Super Peer | xxx | xxx | xxx |
| Reserved Super Peer | zzz | zzz | zzz |

In Table 1, "connected super peer" represents a super peer to which the edge peer is currently connected, and "reserved super peer" represents a super peer with which the edge peer was previously registered and connected. Accordingly, if an edge peer migrates to a specific super peer and then moves to another super peer, the address values of the specific super peer and other super peer are written under "connected super peer" and "reserved super peer," respectively. If an edge peer, which has not been registered or connected with any super peer, is newly connected to a super peer, an address value received from the super peer may be written under "connected super peer" and "reserved super peer." According to this operation, an edge peer may receive and store a region information list from a super peer to which the edge peer is connected, and if the edge peer is disconnected from the super peer and newly connected to a different super peer, the edge peer transfers the region information list to the newly connected super peer and then replaces the region information list with a region information list received from the newly connected super peer. "Time" in Table 1 may correspond to a time at which the edge peer receives an acknowledge message transmitted periodically from a super peer. The region information list may be deleted when the edge peer is initialized or when power is off.

Returning to FIG. 1, the first through seventh super peers R1 through R7 are connected to each other. Each of the first through seventh super peers R1 through R7 collects resource information of edge peers connected thereto, classifies the resource information, and then distributes the classified resource information to at least one other super peer. A super peer which has received resource information from other super peers stores and manages the resource information. The first through seventh super peers R1 through R7 may perform resource management by classifying resource information stored in all edge peers using a hash function, and distributing the classified resource information in predetermined amounts to the super peers. For example, if the total number of resource information pieces of edge peers is 100 and there are four super peers (for example, first through fourth super peers R1 through R4), resource information indexed from 1 to 25 is distributed to the first super peer R1, resource information indexed from 26 to 50 is distributed to the second super peer R2, resource information indexed from 51 to 75 is distributed to the third super peer R3, and resource information indexed from 76 to 100 is distributed to the fourth super peer R4. That is, the super peers R1 through R4 may manage the resource information so that the resource information pieces are indexed from 1 to 100, using the hash function. For resource management, the super peers R1 through R4 may include at least one super peer having an indexing function and at least one super peer for receiving, storing and managing indexes.

Figure 2:
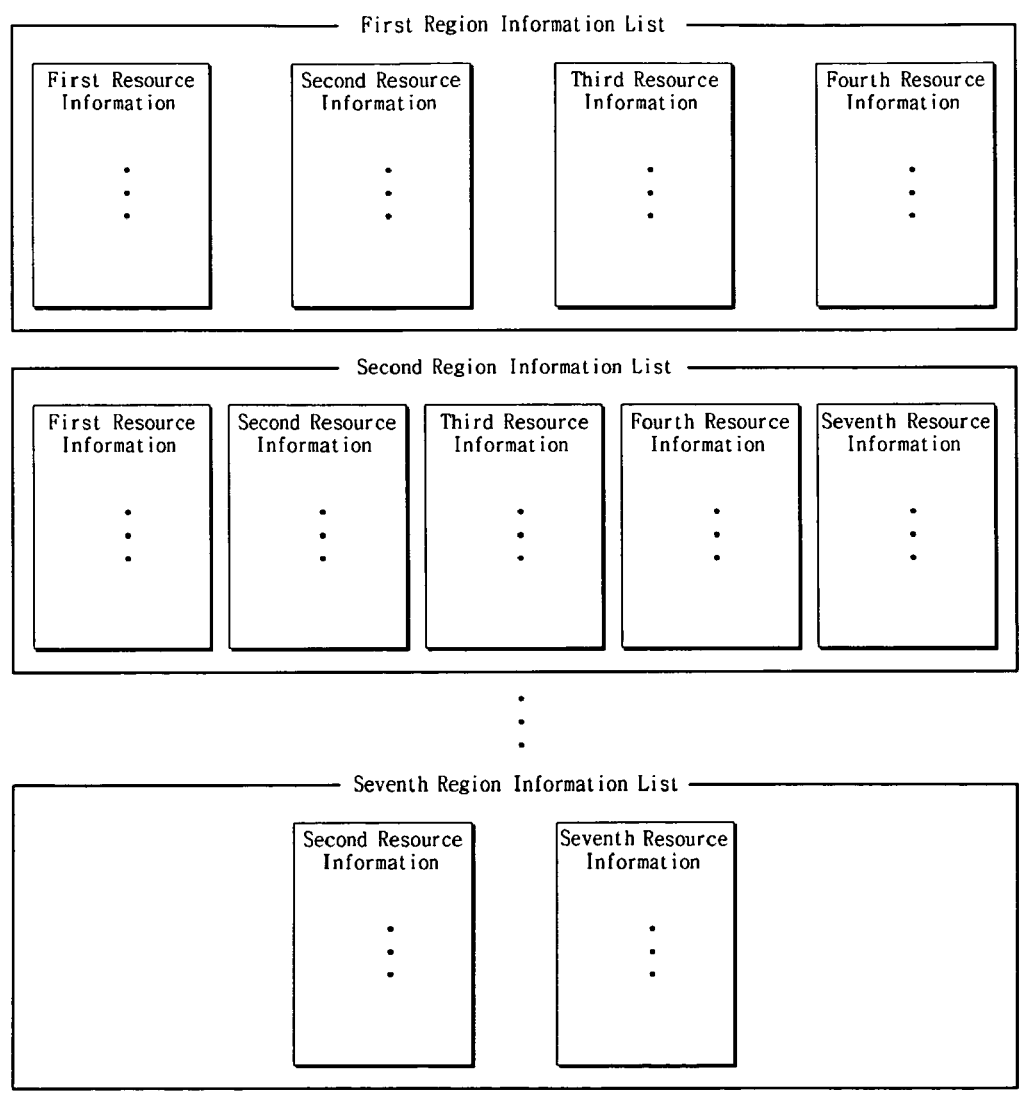
FIG. 2 illustrates one example of a form in which region information lists are shared.

Each super peer may generate a region information list based on edge peers newly registered and connected with the super peer, or based on edge peers that migrated to the super peer and then registered and connected with the super peer. Each super peer may also store and manage the region information list. The region information list may include resource information of super peers e.g., super peers connected to the super peer by one step) with a predetermined hop count from the super peer. For example, as illustrated in FIG. 2, a first region information list of the first super peer R1 may include first resource information of the first super peer R1, second resource information of the second super peer R2, third resource information of the third super peer R3, and fourth resource information of the fourth super peer R4, as the second, third and fourth super peers R2, R3 and R4 are reachable within a hop count of 1 from the first super peer R1. Likewise, a second region information list of the second super peer R2 may include second resource information of the second super peer R2, the first resource information of the first super peer R1, the third resource information of the third super peer R3, the fourth resource information of the fourth super peer R4, and seventh resource information of the seventh super peer R7. Also, a third region information list of the third super peer R3 may include the third resource information of the third super peer R3, the first resource information, the second resource information, the fourth resource information, and sixth resource information of the sixth super peer R6. Also, a forth region information list of the fourth super peer R4 may include the fourth resource information, the first resource information, the second resource information, the third resource information, and fifth resource information of the fifth super peer R5. The fifth super peer R5 may store the fifth resource information, which is its own resource information, and the fourth resource information in its region information list, the sixth super peer R6 may store the sixth resource information, which is its own resource information, and the third resource information in its region information list, and the seventh super peer R7 may store the seventh resource information, which is its own resource information, and the second resource information in its region information list. As described above, each piece of resource information includes information regarding resources stored in edge peers registered and connected with the corresponding super peer.

The above description concerns the case where a specific super peer stores resource information of super peers within a hop count of 1 from itself. However, the number of resource information pieces of a region information list stored in the specific super peer depends on hop count settings. For example, if the hop count is set to 2, super peers may store resource information of other super peers within a hop count of 2 in their region information lists. As an example, the first super peer R1 is connected to the second, third and fourth super peers R2, R3 and R4 with a hop count of 1, and to the fifth, sixth and seventh super peer R5, R6 and R7 with a hop count of 2. Accordingly, if the hop count is set to 2, the first super peer R1 may store all resource information of the second through seventh super peers R2 through R7 in its region information list.

Through the region information lists, the first through seventh super peers R1 through R7 may know the location of resource information of edge peers registered and connected with them. Also, the first through seventh super peers R1 through R7 may know which super peers are adjacent to them and the types and resource information of edge peers registered and connected with the adjacent super peers.

The first through seventh super peers R1 through R7 may store a region information list having a data structure shown in Table 2.

TABLE 2

| Name of Super Peer | IP | Port | netmask | Time | time count |
|---|---|---|---|---|---|
| . . . | . . . | . . . | a.b.c.d | . . . | . . . |

A region information list having the data structure shown in Table 2 may add or discard region information lists of adjacent regions, the region information lists being collected nonspecifically. That is, if a super peer receives a specific region information list from a specific edge peer, the super peer starts a timer and limits the duration of the specific region information list. If a time count reaches zero and the specific region information list has been not updated within a predetermined period, the super peer may determine that a wrong specific region information list has been received and delete the specific region information list from the stored region information list. Also, if the super peer receives a plurality of region information lists having the same network ID (e.g., the same netmask), the super peer may check times at which the region information lists were generated respectively using the timer, and replace the previous region information list with the latest region information list.

In the P2P network system in which region information lists are established as described above, if a super peer receives a query requesting to search for a specific resource from an edge peer (e.g., a request edge peer), the super peer first searches its own region information list to determine whether the specific resource requested by the request edge peer is stored in the super peer or in other super peers connected to itself. If the super peer finds an edge peer storing the specific resource (e.g., a destination edge peer), the super peer may inform the destination edge peer of the fact that the request edge peer is searching for the resource. Accordingly, the destination edge peer establishes a communication channel directly or indirectly with the request edge peer, and transmits the requested resource to the request edge peer through the communication channel.

Meanwhile, in the above-described method, if the super peer fails to find information matching the requested resource in its own region information list, the super peer may perform an operation of transferring the search request query to other supper peers connected to itself and to which resource information is assigned logically or according to a predetermined role. The super peer may also perform an operation of searching for a destination edge peer storing the requested resource and a destination super peer managing the destination edge peer. Further, the super peer may transfer the search request query to other super peers (e.g., super peers with a hop count of 1 from itself) which share their region information lists with the super peer and are under a predetermined condition, causing each of the other super peers to search for resource information corresponding to the requested resource in its own region information list, thereby searching for a destination edge peer storing the requested resource and a destination super peer managing the destination edge peer.

An edge peer receives an acknowledge message multicast by a super peer and transmits a response message to the super peer, thereby being registered and establishing a connection with the super peer. In other words, super peers whose edge peers are connected to each other are located physically closer to each other than to other super peers. Accordingly, if the request edge peer generates a search request query requesting to search for a specific resource and transfers the search request query to a super peer to which the request edge peer is connected, the super peer may first search its own region information list to search for a destination edge peer storing the specific resource and a destination super peer managing the destination edge peer. There is a high probability that the destination super peer and destination edge peer found by the search are located physically close to the request edge peer.

As described above, in the P2P network system according to the current embodiment, each super peer managing resource information of its edge peers shares resource information managed by other super peers with a predetermined hop count from the super peer, thereby providing regional attributes of the resource information. Accordingly, since a request edge peer requesting to search for a resource may first search for the resource in a super peer with which the edge peer is registered and connected and in super peers located adjacent to the super peer, a quick search is possible and path costs of a communication channel between the request edge peer and the corresponding destination edge peer may be minimized when the resource is downloaded. Further, even when some super peers are eliminated or disconnected, the P2P network system supports resource searching and downloading from the remaining super peers.

Hereinafter, an operation of generating and updating a region information list in the P2P network system and an operation of searching for resources based on the region information list, will be described with reference to the drawings.

A region information list is generated or updated when a new edge peer enters the P2P network system, when an edge peer migrates from a certain super peer to another super peer and registers and connects with the other super peer, and when an edge peer is selected as a new super peer when a super peer is eliminated. Certain examples are described below.

Figure 3:
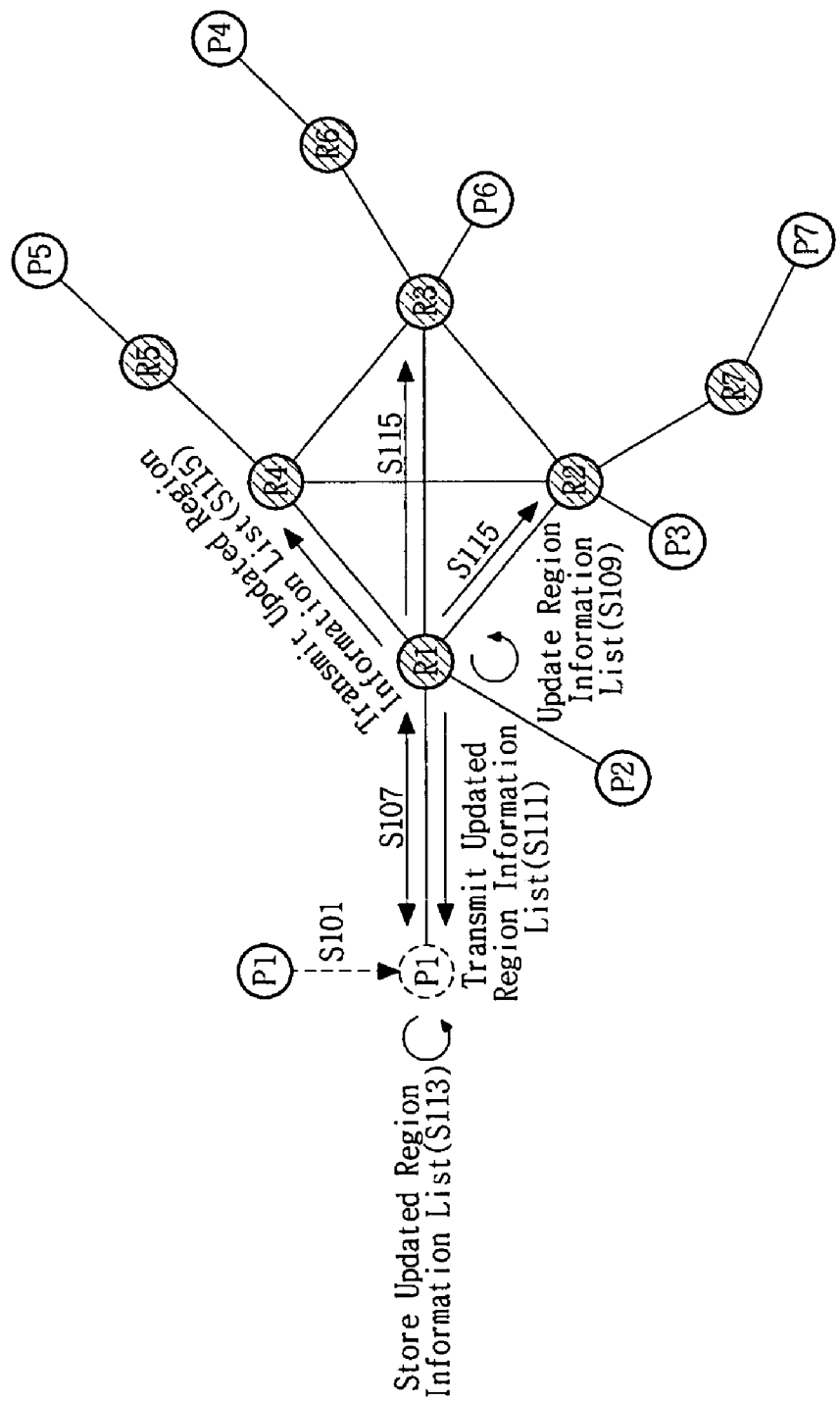
FIG. 3 illustrates an exemplary network configuration for describing generation of a region information list of an edge peer.
Figure 4:
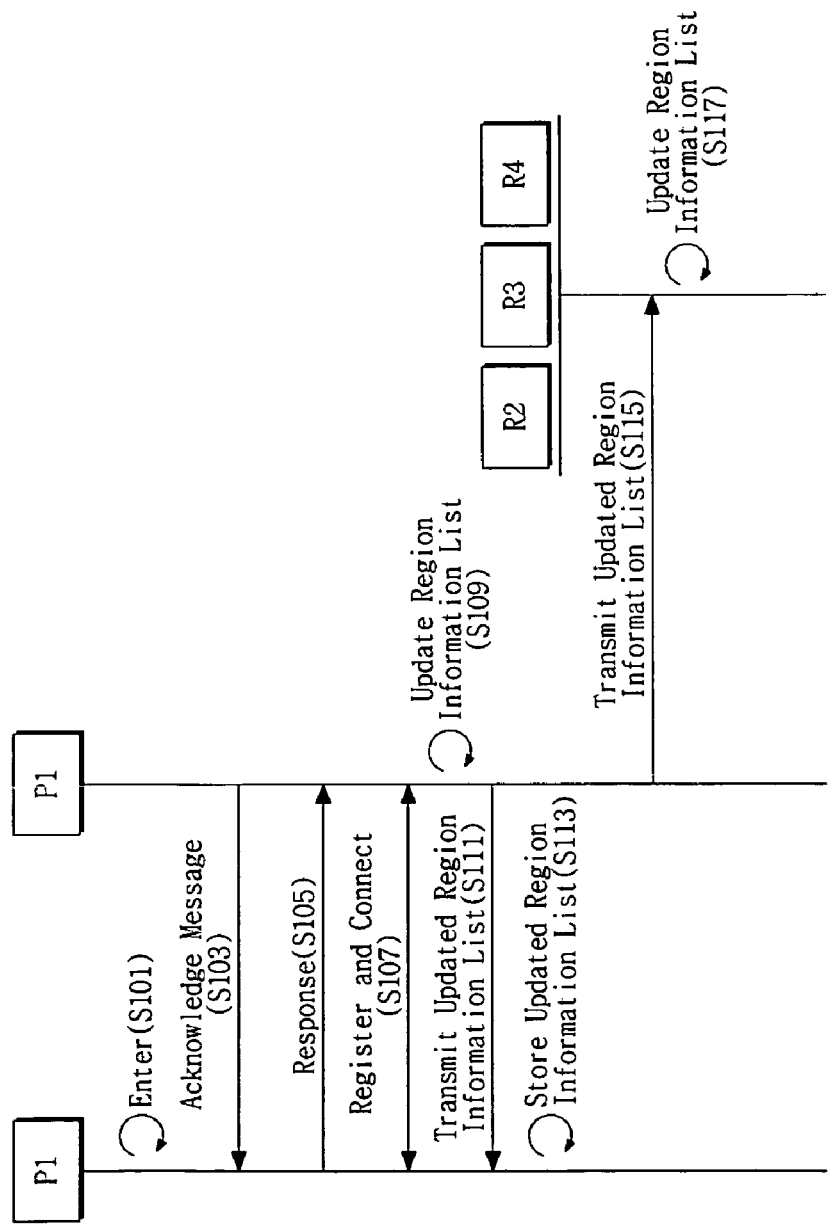
FIG. 4 illustrates exemplary signal flow in a network configuration for describing generation of a region information list of an edge peer.

FIGS. 3 and 4 are views for illustrating an operation by which an edge peer generates a region information list.

In one example, super peers among peers of a P2P network register resources of edge peers registered and connected with the super peers in response to registration requests from the edge peers, generate resource information lists based on the resource information using the hash function described above, and distribute the resource information lists to the respective super peers according to a predetermined rule such that each super peer has the corresponding resource information list.

An operation by which an edge peer generates a region information list is described below with reference to FIGS. 3 and 4. If a first edge peer P1 which has never been registered in any super peer enters a predetermined region which is managed by a first super peer R1 (operation S101), the first edge peer P1 receives an acknowledge message from the first super peer R1 (operation S103), and sends a response message to the first super peer R1 (operation S105). Accordingly, the first edge peer P1 is registered and connected with the super peer R1 (operation S107). Here, the first edge peer P1 may register its own resources with the first super peer R1, and the first super peer R1 may update resource information based on the newly registered resources. The resource information may be information regarding resources, that is, an IP address and port address of the first edge peer P1, the names of resources, file attribute information indicating whether the resources are image files or audio files, and other similar information. The resource information may be replaced by an index value if super peers share resource information based on indexing using the hash function, and the index value may be assigned to a super peer which manages a value range including the index value.

The first super peer R1 multicasts the acknowledge message at regular time intervals (operation S103). Accordingly, when the first edge peer P1 enters a predetermined region in which the first edge peer P1 may communicate with the first super peer R1, that is, when the first edge peer P1 enters within a predetermined range in which the first edge peer P1 may receive the acknowledge message, the first edge peer P1 may receive the acknowledge message from the super peer R1.

The first super peer R1 updates a region information list based on the resource information received from the first edge peer P1 (operation S109). Here, if the first edge peer P1 has never been registered and connected with any other super peer, the first super peer R1 receives no region information list from the first edge peer P1. Then, the first super peer R1 transmits the updated region information list to the first edge peer P1 (operation S111). Here, if the first edge peer P1 is registered and connected with the first super peer R1 to register the resource of the first edge peer P1 with the first super peer R1, the first super peer R1 generates resource information based on the resource and shares the resource information with other super peers. If the first super peer R1 already has a region information list generated by collecting resource information lists of other super peers with a predetermined hop count from the first super peer R1, the resource information lists of the other super peers may also be changed. If the resource information list of any one of the super peers adjacent to the super peer is changed, the first super peer R1 receives the changed resource information list from the corresponding super peer and updates the region information list by replacing the corresponding resource information list with the changed resource information list.

In the P2P network illustrated in FIG. 3, if each super peer is aware of super peers located adjacent to itself (if each super peer is be aware of super peers located adjacent to itself due to movement of edge peers), the adjacent super peers share their resource information lists with each other such that each super peer establishes its own region information list. If a hop count is set to 1 or less, the first super peer R1 transmits the region information list to its adjacent super peers, that is, to the second, third and fourth super peers R2, R3 and R4 (operation S115). Accordingly, the second, third and fourth super peers R2, R3 and R4 may update their region information lists using the received region information list (operation S117). The first super peer R1 may transfer only data corresponding to a updated part of its original region information list to the second, third and fourth super peers R2, R3 and R4 (operation S115). Accordingly, the second, third and fourth super peers R2, R3 and R4 compare the received region information list with their original region information lists and change parts of the original region information lists corresponding to the received data, thereby updating the region information lists.

If no edge peer moves, that is, if the first super peer R1 is in an initialized state, the first super peer R1 may not be able to recognize super peers located adjacent to itself. Here, each super peer has its own resource information list which has been distributed to the super peer according to a predetermined rule. In this state, if the first edge peer P1 newly enters a communication region of the first super peer R1 and is registered and connected with the first super peer R1, the first super peer R1 transmits its own resource information list as a region information list to the first edge peer P1. The first edge peer P1 may store the region information list having only the resource information list of the first super peer R1 (operation S113).

As described above, in the operation by which an edge peer generates a region information list, when an edge peer which has never been registered with any super peer newly enters a communication region of a super peer, the edge peer receives a region information list from the super peer and stores the region information list. The region information list may be a region information list including only a resource information list of the super peer, or may be a region information list including resource information of all super peers adjacent to the super peer, according to the current state of the P2P network.

A super peer, into whose communication region a new edge peer enters, generates resource information based on any resources stored in the edge peer and distributes the resource information according to a predetermined rule, thereby updating the resource information list of the super peer. The super peer having the updated resource information list informs super peers adjacent to itself of the fact that the resource information list has changed, thus causing the adjacent super peers to update their region information lists based on the updated resource information list.

Figure 5:
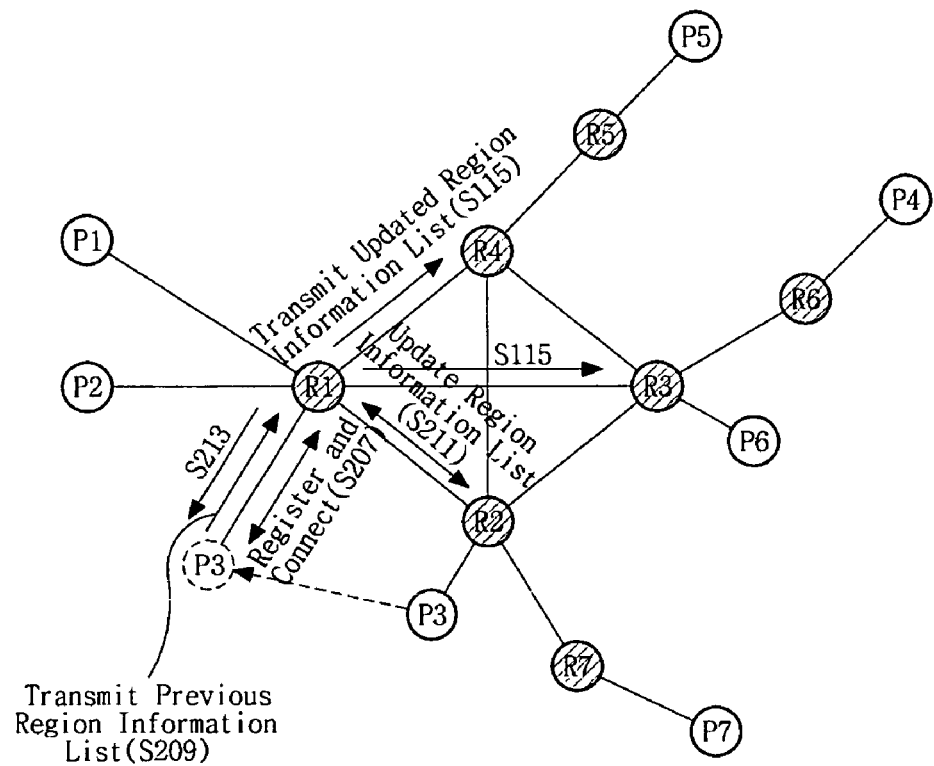
FIG. 5 illustrates an exemplary network configuration for describing updating of a region information list when an edge peer moves.
Figure 6:
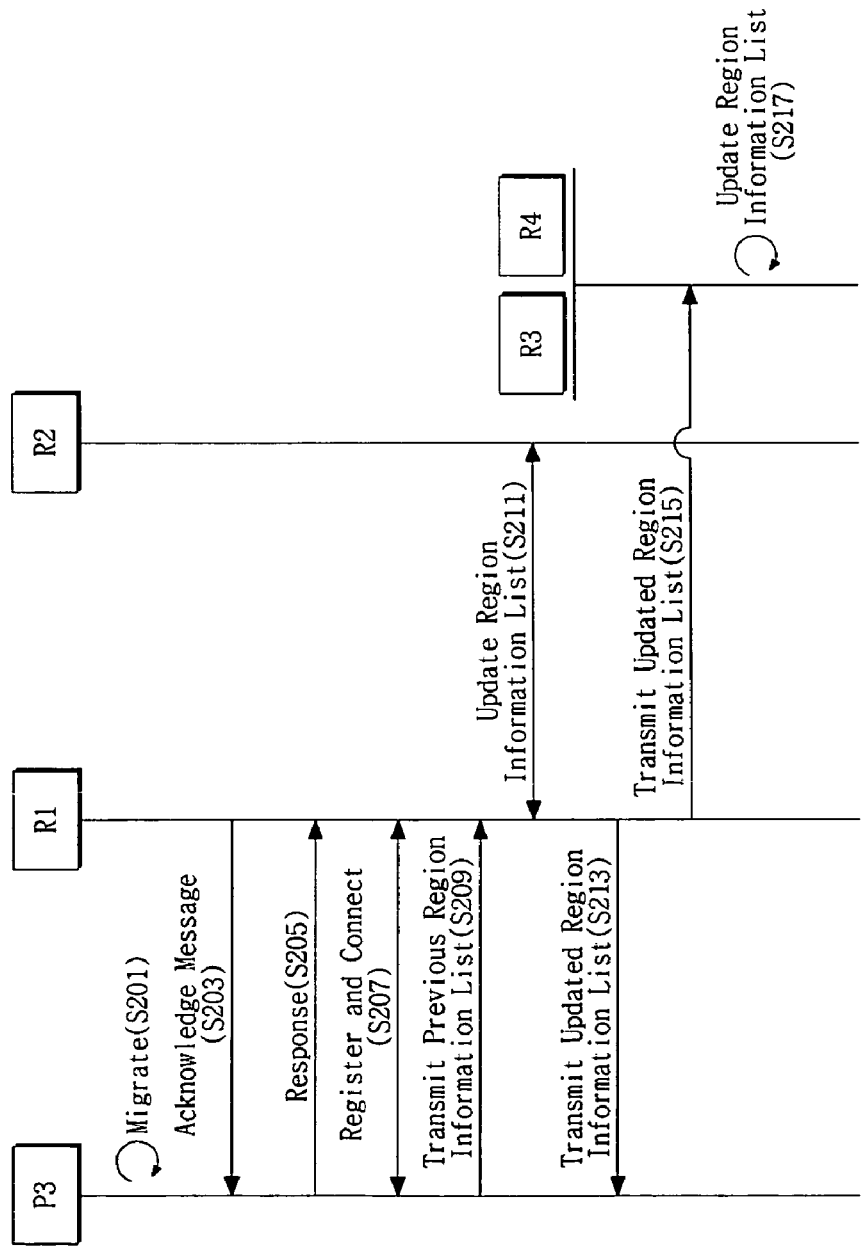
FIG. 6 illustrates exemplary signal flow in a network configuration for describing updating of a region information list when an edge peer moves.

FIG. 5 illustrates an exemplary network configuration for describing updating of a region information list when an edge peer moves, and FIG. 6 illustrates exemplary signal flow in a network configuration for describing updating of a region information list when an edge peer moves.

Hereinafter, each super peer generates resource information regarding resources stored in all edge peers by performing initialization, and the generated resource information is distributed to respective super peers according to a predetermined rule. Accordingly, each super peer has a resource information list in which resource information corresponding to the resources of its edge peers is listed in the form of a table.

An operation of updating a region information list will be described with reference to FIGS. 5 and 6. If a third edge peer P3, which is registered and connected with a second super peer R2, enters a communication region of the first super peer R1 (operation S201), the third edge peer P3 receives an acknowledge message from the first super peer R1 (operation S203). The acknowledge message is multicast by the first super peer R1 at regular time intervals and enables the first super peer R1 to recognize edge peers near the first super peer R1. The third edge peer P3, which has received the acknowledge message, transmits a response message to the first super peer R1 (operation S205), and thus is registered and connected with the first super peer R1 (operation S207). At this time, the third edge peer P3 transmits a stored region information list received from the second super peer R2 to the first super peer R1 (operation S209). Here, the region information list may include only a resource information list of the second super peer R2, if the second super peer R1 has never received a resource information list from other super peers adjacent to the second super peer R2.

The first super peer R1 determines whether the second super peer R2 is adjacent to the first super peer R1, based on the region information list received from the third edge peer P3. If it is determined that the second super peer R2 is adjacent to the first super peer R1, the first super peer R1 communicates with the second super peer R2 and updates its own region information list, and the second super peer R2 also updates its own region information list, using the region information list of the first super peer R1 (operation S211). The first super peer R1 may transmit the updated region information to the third edge peer P3 (operation S213).

If the first super peer R1 determines that third and fourth super peers R3 and R4 are adjacent to itself, the first super peer R1 may transmit the updated region information list to the third and fourth super peers R3 and R4 (operation S215). Accordingly, the third and fourth super peers R3 and R4 may update their own region information lists based on the received region information list (operation S217).

Here, the first super peer R1 may determine if the second super peer R2 is adjacent by collecting the region information list of the second super peer R2 upon movement of the third edge peer P3, however the third and fourth super peers R3 and R4 may not determine if the second super peer R2 is adjacent. Accordingly, in order for the third and fourth super peers R3 and R4 to update their region information lists based on the updated region information list of the first super peer R, a hop count of a predetermined rule has to be set to 2 or 3 or more. That is, the third and fourth super peers R3 and R4 to which the second super peer R2 is connected via the first super peer R1 are recognized as super peers with a hop count of 2 or more from the second super peer R2. Thereafter, if an edge peer registered and connected with the second super peer R2 migrates to a communication region of the third or fourth super peer R3 or R4, the third or fourth super peer R3 or R4 may recognize the second super peer R2 as a super peer located adjacent the third or fourth super peer R3 or R4. If the hop count of the predetermined rule is set to 1, the first super peer R1 may not transmit the updated region information list to the third and fourth super peers R3 and R4 when the hop count between the third and fourth super peers R3 and R4 and the second super per R2 exceeds 2.

As described above, in the operation of updating the region information list, when an edge peer migrates from a super peer with which it was registered and connected to a communication region of a new super peer and is registered and connected with the new super peer, the region information list of the previous super peer is provided to the new super peer so that the previous super peer and the new super peer share the region information list. Since movement of the edge peer from the previous super peer to the communication region of the new super peer implies a high probability that the new super peer is located physically close to the previous super peer, the process of updating the region information list supports sharing of a region information list between adjacent super peers that are within a predetermined distance defined by a predetermined rule.

Figure 7A:
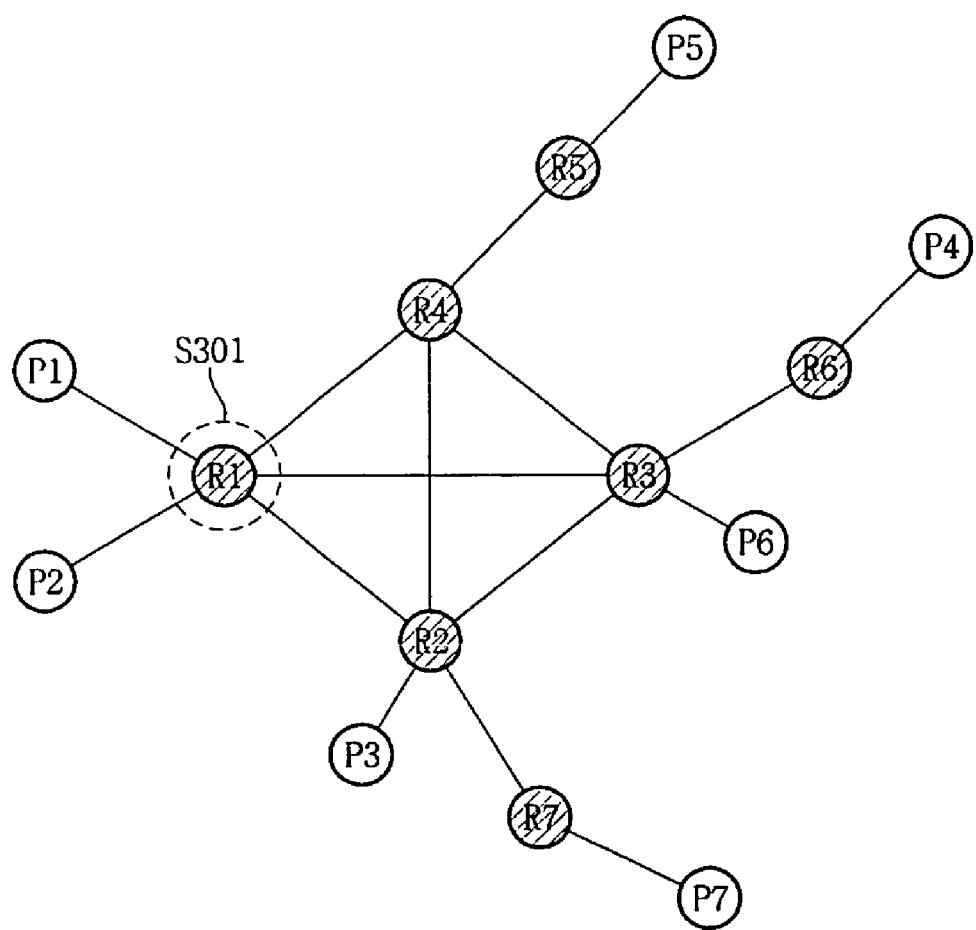
FIGS. 7A and 7B illustrate exemplary network configurations for describing updating of a region information list when a super peer is eliminated.
Figure 7B:
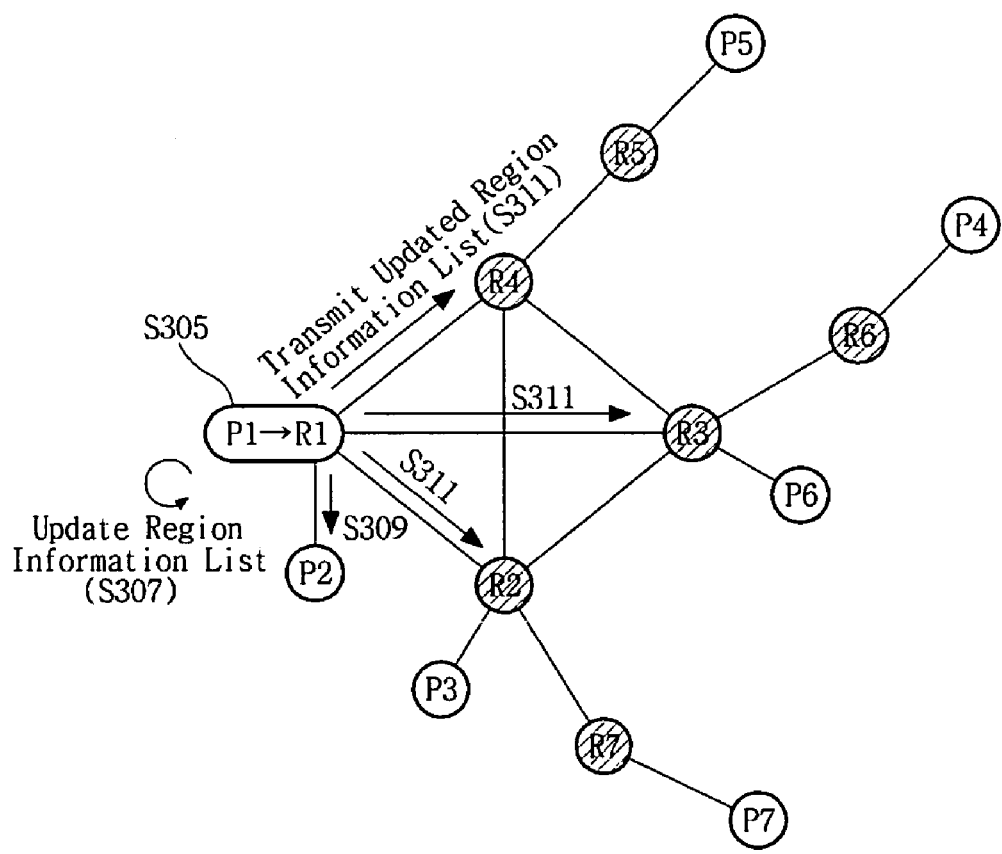
Figure 8:
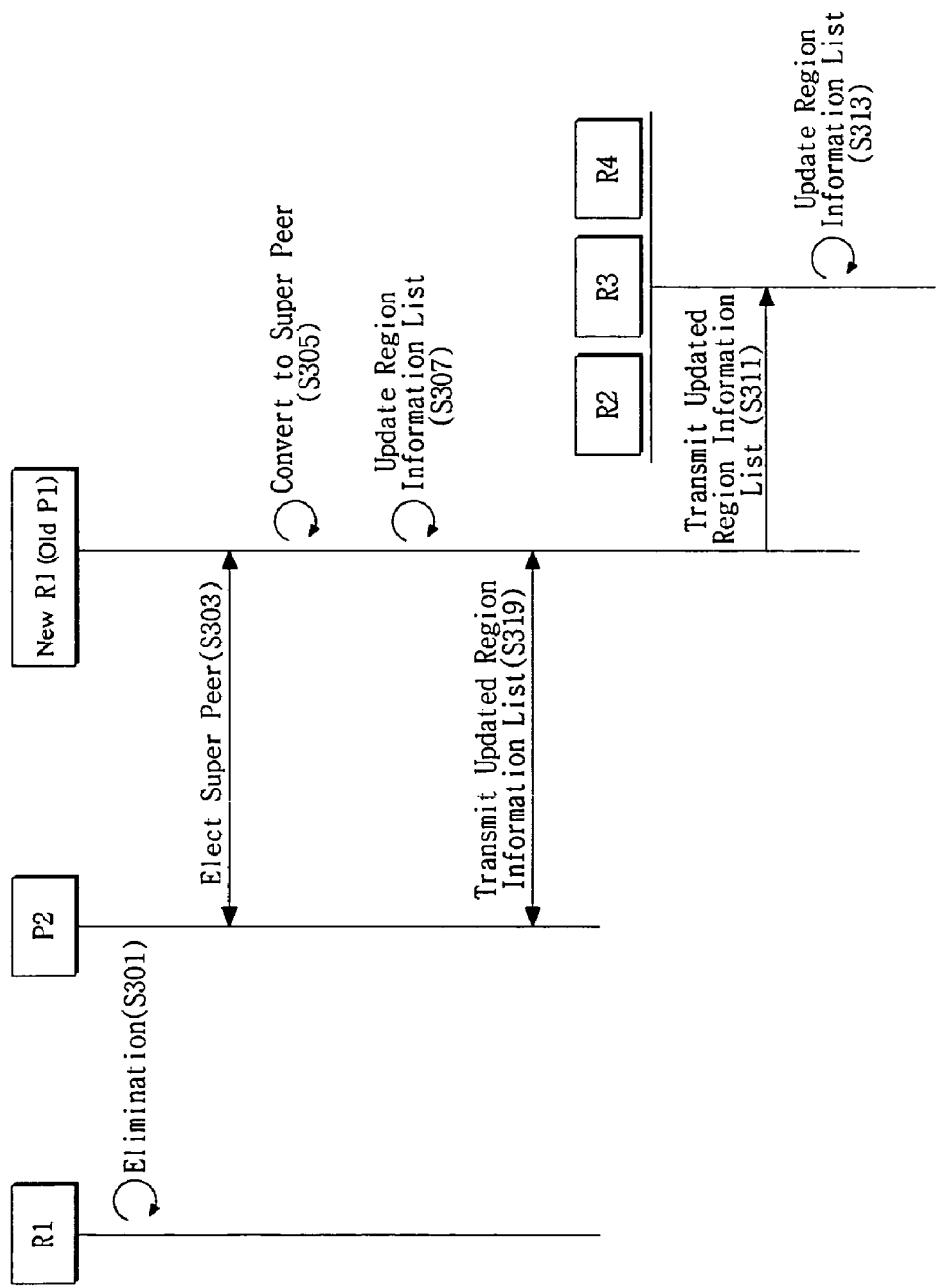
FIG. 8 illustrates exemplary signal flow in a network configuration for describing updating of a region information list when a super peer is eliminated.

FIGS. 7A and 7B illustrate exemplary network configurations for describing updating of a region information list when a super peer is eliminated, and FIG. 8 illustrates exemplary signal flow in a network configuration for describing updating of a region information list when a super peer is eliminated.

In the following description, a first super peer among a plurality of super peers is eliminated and a first edge peer is elected as a new first super peer. A process of electing a new super peer may be performed when a plurality of edge peers belonging to a group registered and connected with the first super peer do not receive for a predetermined time period an acknowledge message which is generally received periodically from the first super peer. The process of electing a new super peer may be performed under various conditions. For example, after transmitting and receiving information regarding the system performances of edge peers, an edge peer having the best performance is elected as a new super peer, or an edge peer capable of being connected most quickly to other super peers (e.g., an edge peer with the least hop count from other super peers) is elected as a new super peer. Alternatively, a new super peer may be elected randomly or according to a predetermined rule.

In the following description, each super peer performs information backup by transmitting a resource information list and region information list stored in the super peer, at regular time intervals, to at least one edge peer among edge peers registered and connected with the super peer.

An operation of updating a region information list when a super peer is eliminated will be described with reference to FIGS. 7A and 8. First, as illustrated in FIGS. 7A and 8, a first super peer R1 is eliminated for one of various reasons (operation S301). The various reasons may include the cut-off of power to a terminal corresponding to the first super peer R1, or movement of the first super peer R1 too far away to transmit an acknowledge message to edge peers registered and connected with the first super peer R1.

If the first super peer R1 is eliminated, a specific edge peer (a first edge peer P1 in the current embodiment) among first and second edge peers P1 and P2 registered and connected with the first super peer R1 is elected as a new first super peer R1 (operations S303 and S305). That is, in operation S303, it is determined under a predetermined condition which one of the first and second edge peers P1 and P2 may be elected as a new super peer R1. If the first edge peer P1 meets the predetermined condition, in operation S305, the first edge peer P1 is elected as a new first super peer R1.

The new first super peer R1 makes a new registration and connection relationship with other edge peers that were registered and connected with the eliminated first super peer, based on the resource information list and region information list received from the eliminated first super peer R1. Then, the new first super peer R1 updates its own region information list (operation S307). That is, changes in resource information due to elimination of the first super peer and election of the new first super peer are applied to the region information list. For example, the new first super peer R1 changes an IP address or port address among information included in the resource information list and region information list, or changes information regarding the connection relationship with other super peers.

If the region information list is updated, the new first super peer R1 transmits the updated region information list to an edge peer (e.g., a second edge peer P2) currently registered and connected with the new first super peer R1 (operation S309).

Also, if information regarding adjacent super peers (e.g., information regarding the second, third and fourth super peers R2, R3 and R4) is included in the region information list received from the eliminated first super peer R1, the new first super peer R1 communicates with the super peers R2, R3 and R4 provide information regarding the election of the first edge peer P1 as a new first super peer R1 (operation S311). In operation S311, the new first super peer R1 may transmit the updated region information list to the super peers R2, R3 and R4. Accordingly, the second, third and fourth super peers R2, R3 and R4 may apply the updated region information list to their region information lists, thereby updating their region information lists (operation S313).

As described above, in the region information list updating process, if a super peer with which edge peers are registered and connected is eliminated, wherein the edge peers store a region information list of the super peer, a newly elected super peer updates the region information list based on its own region information list. Also, the newly elected super peer shares the updated region information list with super peers located adjacent to the newly elected super peer, thereby updating the region information lists of the adjacent super peers.

In the above description, when the region information lists are updated, they are updated according to a predetermined rule (e.g., depending on a hop count). For example, if a hop count is set to "1," each super peer collects resource information lists of super peers with a hop count of 1 from the super peer and generates and updates a region information list. The super peer substantially receives only a resource information list of the corresponding super peer from other super peers, thus generating and updating a region information list. If the hop count is set to "2," each super peer collects resource information lists of other super peers within a hop count of 2 from the super peer, thus generating and updating a region information list.

An operation where an edge peer searches a resource in the P2P network system which operates the region information lists will be described.

In the following description, resource information stored in edge peers for resource searching is classified and distributed by super peers.

Figure 9:
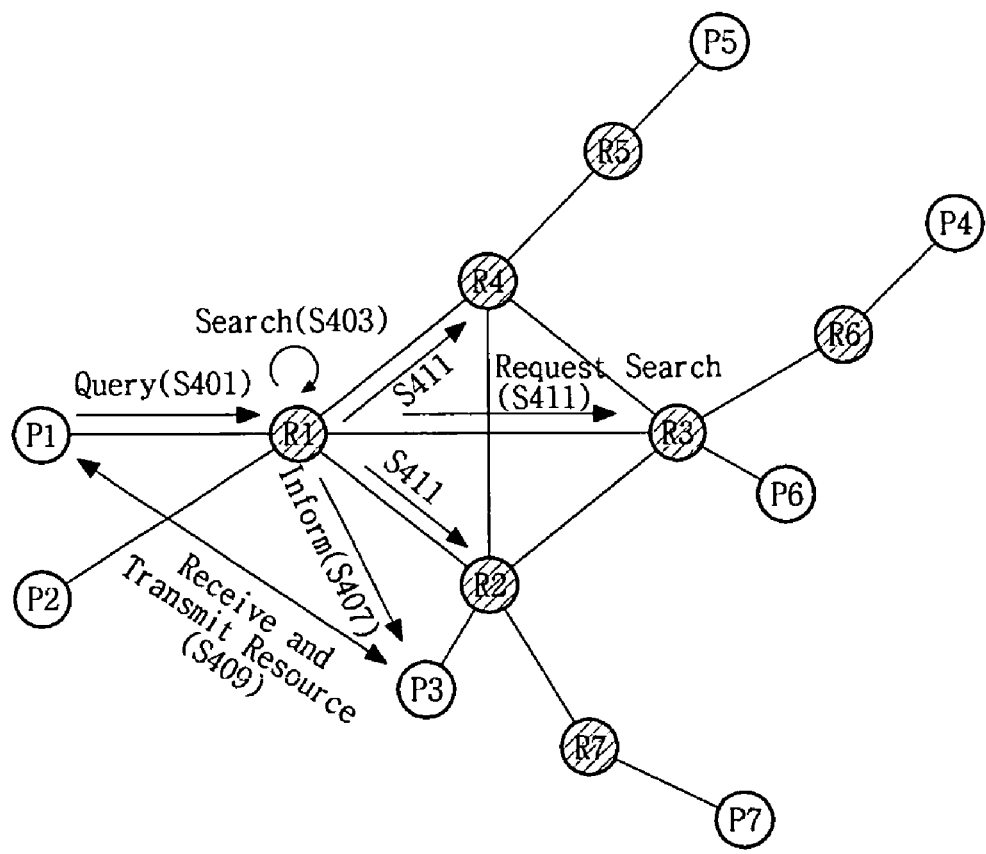
FIG. 9 illustrates an exemplary network configuration for describing a process of searching for a resource based on a region information list.
Figure 10:
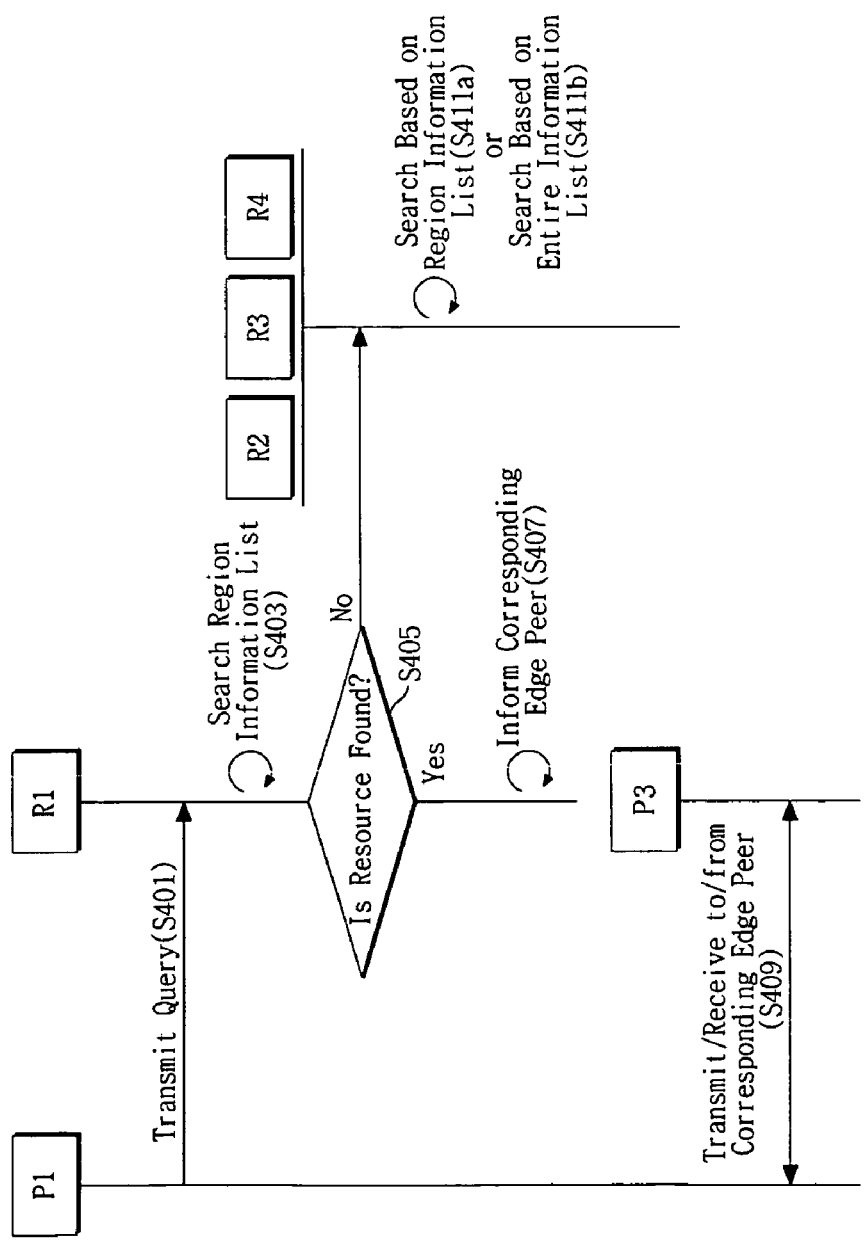
FIG. 10 illustrates exemplary signal flow in a network configuration for describing a process of searching for a resource based on a region information list.

FIG. 9 illustrates an exemplary network configuration for describing a process of searching for a resource based on a region information list, and FIG. 10 illustrates exemplary signal flow in a network configuration for describing a process of searching for a resource based on a region information list.

In the following description, a request edge peer requesting to search for a resource is a first edge peer P1, and the first edge peer P1 generates a query for requesting to search for the resource.

Referring to FIGS. 9 and 10, first, the first edge peer P1 (e.g., request edge peer P1) generates a query for requesting to search for a resource (operation S401) and transmits the query to a first super peer R1. Here, the query is information for searching for the resource and may be a keyword capable of searching for resource information corresponding to the resource. Each super peer manages a resource information list including resource information corresponding to resources stored in edge peers connected to the super peer. Accordingly, the request edge peer P1 includes a keyword or the like, corresponding to a desired resource in the query, in order to search for the desired resource from among resource information stored in super peers. For example, if the resource information is set up as a resource's name, the request edge peer P1 includes the name of a resource to be searched for in the query.

The first super peer R1 searches for the resource information requested by the request edge peer P1 based on a region information list stored by the first super peer R1. Here, the region information list may include resource information lists of other super peers located adjacent to the first super peer R1 (for example, second, third and fourth super peers R2, R3 and R4), as well as the resource information list of the first super peer R1. Accordingly, the first super peer R1 extracts a keyword from the query and determines whether resource information matching the keyword exists in its own region information list.

The above description relates to the case where resource information is generated as a keyword corresponding to a resource's name, but the operations are not limited to this case. That is, if each super peer manages resource information by matching each resource information with specific index values in order to enhance resource management efficiency, the first super peer R1 converts the keyword included in the query into an index value and determines which super peer manages the corresponding resource information according to the index value. For example, if keywords "A", "B" and "C" are matched respectively with index values "1", "2" and "3", and the second super peer R2 manages the index values "1", "2" and "3", a resource information list of the second super peer R2 includes the index values "1", "2" and "3". Also, if a region information list of the first super peer R1 includes the resource information list of the second super peer R2, the first super peer R1 may check the resource information list stored in the second super peer R2. If the first edge peer P1 transmits a query including the keyword "A" to the first super peer R1, the first super peer R1 extracts the index value "1" corresponding to the keyword "A", and recognizes the second super peer R2 managing the index value "1" and an edge peer with a resource corresponding to the index value "1".

Through the above-described operations, the first super peer R1 determines whether or not the resource requested by the first edge peer P1 is in the region information list of the first super peer R1 (operation S405). If it is determined in operation S405 that the resource requested by the first edge peer P1 is in the region information list of the first super peer R1, the process proceeds to operation S407 and the first super peer R1 informs an edge peer (a destination edge peer) including the resource that the requested resource is in the edge peer.

Here, if the destination edge peer is the third edge peer P3, the third edge peer P3 may receive a message indicating that the first edge peer P1 is requesting the resource, from the first super peer R1 (operation S407). Then, the third edge peer P3 establishes a communication channel with the first edge peer P1 (operation S409) and transmits the stored resource to the first edge peer P1. For this operation, the first super peer R1 transmits an IP address of the first edge peer P1 to the third edge peer P3 along with the resource request message.

Meanwhile, if it is determined in operation S405 that the first super peer R1 finds no resource information corresponding to the resource requested by the first edge peer P1 in its own region information list, the first super peer R1 may select one of two options (operations S411A and S411B). That is, the first super peer R1 transmits request information to super peers that share their resource information lists with the first super peer R1 (in the current embodiment, the second, third and fourth super peers R2, R3 and R4), while issuing a request to search for region information corresponding to request information to the second, third and fourth super peers R2, R3 and R4 (operation S411A). Then, the second, third and fourth super peers R2, R3 and R4 may search for resource information corresponding to the request information from their own region information lists. Since the second super peer R2 includes a first resource information list, a second resource information list, a third resource information list, a fourth resource information list, and a seventh resource information list in its own region information list, the second super peer R2 can determine whether resource information matching the request information exists in the seventh resource information list, excluding the first, second, third and fourth resource information lists that the first super peer R1 shares. Likewise, the third super peer R3 can determine whether resource information matching the request information exists in the sixth resource information list which the sixth super peer R6 shares, and the fourth super peer R4 can determine whether resource information matching the request information exists in the fifth resource information list which the fifth super peer R5 shares.

Meanwhile, if in operation S405, the first super peer R1 finds no resource information corresponding to the requested information in its own region information list, the first super peer R1 may request to search for the resource in the resource information lists stored in the respective super peers. That is, when searching of resource information in a region information list fails, the first super peer R1 broadcasts request information to super peers which are logically connected to the first super peer R1 or to which resource information lists are distributed, such that each super peer searches for resource information matching the request information in its own resource information and the request information received from the first super peer R1. If the first super peer R1 fails to find resource information corresponding to the requested information in its own resource information list, the first super peer R1 transfers a resource information request to other super peers connected to the first super peer R1 to enable the other super peers to search for the resource information in their resource information lists.

As described above, since super peers connected to a request edge peer may respectively search for a resource requested by the request edge peer among a large amount of resources stored in the super peers, search speed may be improved. Since a destination edge peer is searched for among super peers located close to a request super peer, path costs between the request edge peer and the destination edge peer may be minimized in the P2P network where a plurality of destination edge peers share the same file. Also, since the resource searching process allows local searching, resource searching is possible even when some peers in the P2P network are eliminated.

In other words, in the P2P network system according one example, since a super peer shares its own resource information list with adjacent super peers (for example, super peers with a hop count of 1) meeting a predetermined rule, and manages the shared resource information list as a region information list, the super peer may support a request edge peer requesting to search for a specific resource so that the request edge peer may perform a resource search based on the region information list. In the P2P network system, upon sharing of the resource information list, the super peer transfers its own resource information list to edge peers to store the resource information list in the edge peers, and extracts a resource information list from an edge peer which migrates to the super peer to recognize other nearby super peers.

However, super peers may share their resource information lists with each other through communication, by classifying and distributing resource information to the respective super peers to cause each super peer to generate and manage its own resource information list. Here, the method of sharing the resource information lists through communication between super peers may provide a fixed load to the network as communication between the super peers is performed continuously, at regular time intervals. Also, although a hop count is limited, there may be difficulties in determining which super peers with the limited hop count are adjacent to each other. Accordingly, in order to generate and manage a region information list by sharing resource information lists between super peers, adjacency of super peers is checked using mobility of edge peers. As a result, it is possible to support super peers to share resource information lists and perform resource searching using the resource information lists as a region information list, wherein mobility of edge peers is used to generate and manage the region information list. Here, a method for communication between super peers may be applied to generate and manage the region information list.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A peer-to-peer (P2P) network system comprising:
   at least one edge peer for storing a resource; and
   at least one super peer for classifying and distributing resource information regarding the resource stored in the at least one edge peer, and for generating and managing a resource information list using the resource information, wherein
   the at least one edge peer is registered and connected to the at least one super peer, and the at least one super peer generates and manages a region information list to include the resource information of an adjacent super peer by sharing the resource information list with the adjacent super peer and wherein the resource information comprises a resource name and an identification address of a location at which the resource is stored, and
   the at least one edge peer receives and stores the resource information list and the region information list from the at least one super peer with which the at least one edge peer is registered and connected.

2. The P2P network system of claim 1, wherein when the at least one edge peer migrates to a different super peer, to be registered and connected with the different super peer, the at least one edge peer transfers a previous region information list received from a previous super peer with which the at least one edge peer was registered and connected, to the different super peer, and updates the previous region information list to a region information list received from the different super peer.

3. The P2P network system of claim 2, wherein the at least one super peer receives the previous region information list from the at least one edge peer, and shares the region information list by communicating with the previous super peer based on the previous region information list.

4. The P2P network system of claim 3, wherein the at least one super peer transfers to the at least edge peer an updated region information list, the updated region information list generated by sharing the region information list with the previous super peer.

5. The P2P network system of claim 4, wherein the at least one super peer transmits the updated region information list to the different super peer.

6. A peer-to-peer (P2P) network system comprising:
   at least one edge peer for storing a resource; and
   at least one super peer for classifying and distributing resource information regarding the resource stored in the at least one edge peer, and for generating and managing a resource information list using the resource information, wherein
   the at least one edge peer is registered and connected to the at least one super peer, and the at least one super peer generates and manages a region information list to include the resource information of an adjacent super peer by sharing the resource information list with the adjacent super peer and wherein the resource information comprises a resource name and an identification address of a location at which the resource is stored, and
   when the at least one edge peer requests to search for a resource, the at least one super peer searches for the resource in the region information list.

7. The P2P network system of claim 6, wherein when the at least one super peer fails to find resource information corresponding to the resource requested to be searched for in the region information list by the at least one edge peer, the at least one super peer requests a different super peer, which receives distributed resource information, to search for the resource.

8. The P2P network system of claim 6, wherein when the at least one super peer fails to find resource information corresponding to the resource requested to be searched for in the region information list by the at least one edge peer, the at least one super peer requests other super peers, which receive distributed resource information, to search for the resource.

9. A method of operating a peer-to-peer (P2P) network system based on region, comprising:
   registering and connecting at least one edge peer, the at least one edge peer storing resources with at least one super peer for generating and managing a resource information list by classifying and distributing resource information regarding resources of a plurality of edge peers, resource information comprising a resource name and an identification address of a location at which the resource is stored;
   sharing the resource information list of the at least one super peer with at least one other super peer;
   generating, at the at least one super peer, a region information list to include the shared resource information list;
   receiving and storing, at the at least one edge peer, the resource information list and the region information list from the at least one super peer with which the at least one edge peer is registered and connected;
   migrating the at least one edge peer;
   registering and connecting the at least one edge peer with a different super peer due to the migration of the edge peer;
   transferring, at the at least one edge peer, a previous region information list received from a previous super peer, the at least one edge peer previously registered and connected with the previous super peer, to the at least one super peer with which the edge peer is registered and connected;
   updating, at the at least one edge peer, the previous region information list to the region information list received from the at least one super peer with which the at least one edge peer is registered and connected;
   receiving, at the super peer, the previous region information list received from the previous super peer with which the at least one edge peer was registered and connected, from the moved at least edge peer; and
   sharing the region information list by communicating with the previous super peer based on the previous region information list.

10. The method of claim 9, further comprising:

transferring, at the at least one super peer, an updated region information list generated by sharing the region information list with the previous super peer to the at least one edge peer.

11. The method of claim 10, further comprising:

transmitting, at the at least one super peer, the updated region information list to the different super peer, the different super peer sharing its region information list with the at least one super peer.

12. A method of operating a peer-to-peer (P2P) network system based on region, comprising:

registering and connecting at least one edge peer, the at least one edge peer storing resources with at least one super peer for generating and managing a resource information list by classifying and distributing resource information regarding resources of a plurality of edge peers, resource information comprising a resource name and an identification address of a location at which the resource is stored;

sharing the resource information list of the at least one super peer with at least one other super peer;

generating, at the at least one super peer, a region information list to include the shared resource information list;

receiving and storing, at the at least one edge peer, the resource information list and the region information list from the at least one super peer with which the at least one edge peer is registered and connected;

migrating the at least one edge peer;

registering and connecting the at least one edge peer with a different super peer due to the migration of the edge peer;

transferring, at the at least one edge peer, a previous region information list received from a previous super peer, the at least one edge peer previously registered and connected with the previous super peer, to the at least one super peer with which the edge peer is registered and connected;

updating, at the at least one edge peer, the previous region information list to the region information list received from the at least one super peer with which the at least one edge peer is registered and connected;

requesting, at the at least one edge peer, the at least one super peer with which the at least one edge peer is registered and connected to search for a resource; and searching, at the at least one super peer, for the resource in the region information list.

13. The method of claim 12, further comprising:

when the at least one super peer fails to find resource information corresponding to the resource requested to be searched for in the region information list by the at least one edge peer, requesting, at the at least one super peer, a different super peer sharing its own region information list with the at least one super peer to search for the resource.

14. The method of claim 12, further comprising:

when the at least one super peer fails to find resource information corresponding to the resource requested to be searched for in the region information list by the at least one edge peer, requesting, at the super peer, a plurality of super peers to which the resource information has been distributed to search for the resource.

\* \* \* \* \*